UNITED STATES PATENT OFFICE.

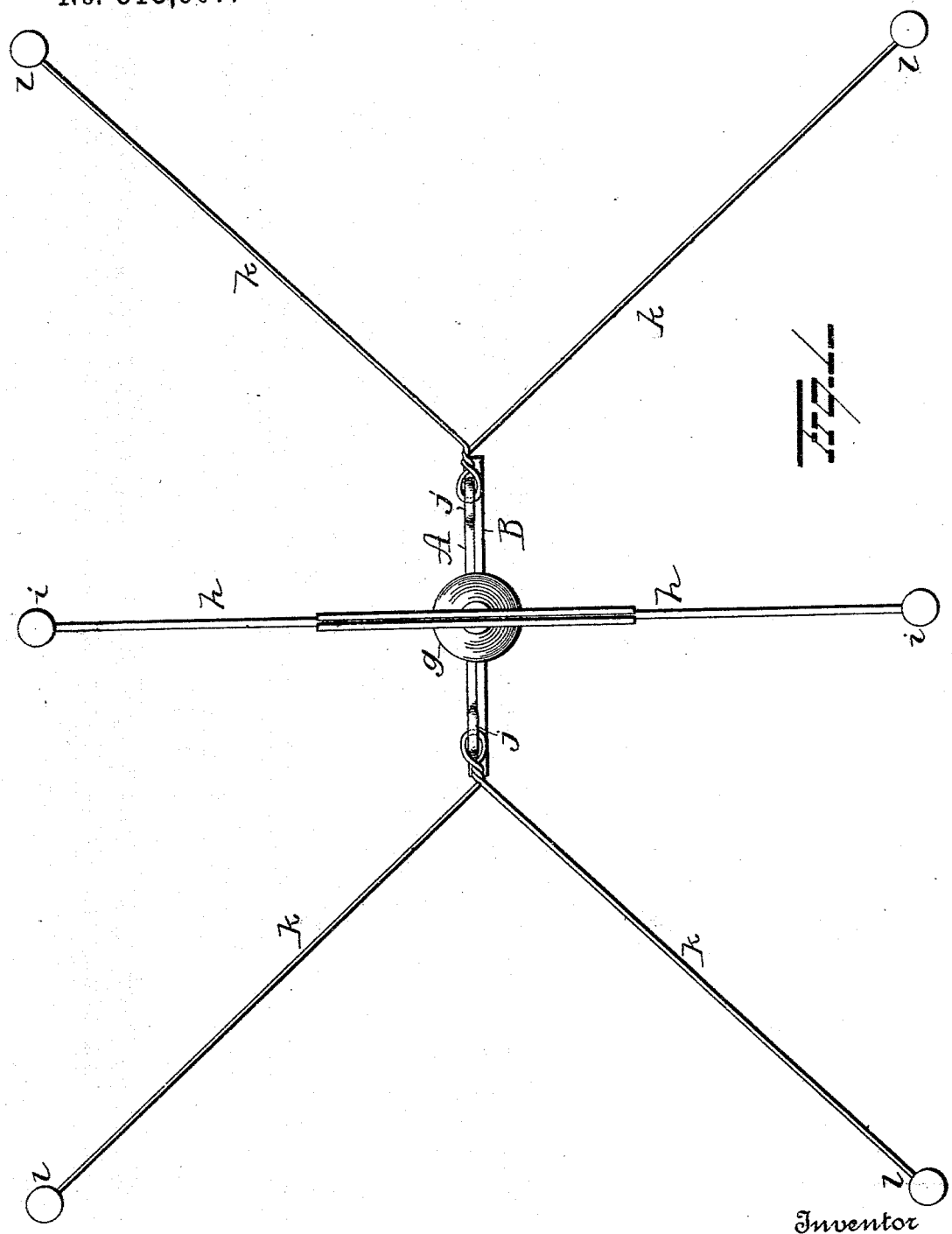

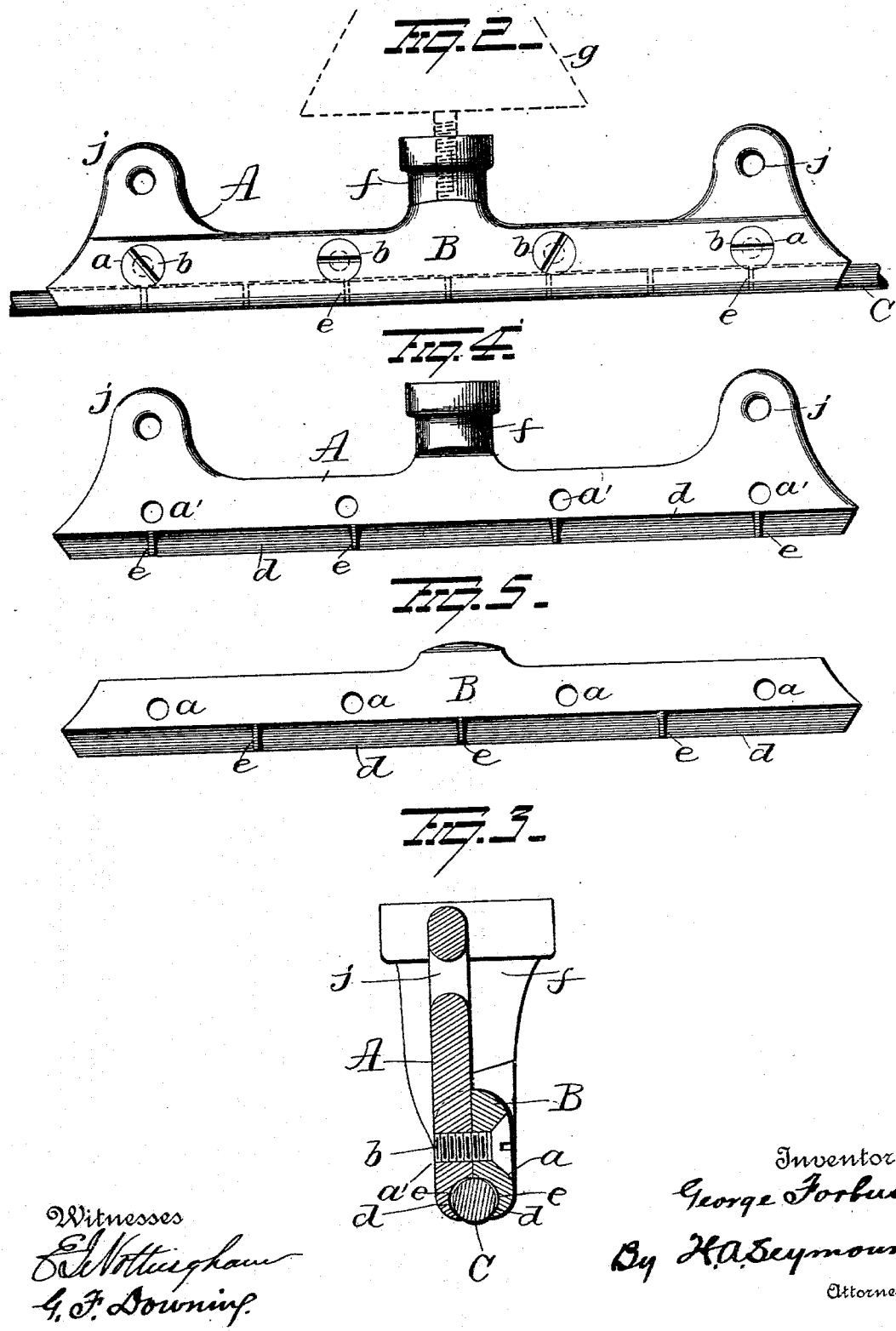

GEORGE FORBUS, OF WILLIAMSPORT, PENNSYLVANIA.

HANGER FOR TROLLEY-WIRES.

SPECIFICATION forming part of Letters Patent No. 515,907, dated March 6, 1894.

Application filed September 6, 1893. Serial No. 484,931. (No model.)

*To all whom it may concern:*

Be it known that I, GEORGE FORBUS, of Williamsport, in the county of Lycoming and State of Pennsylvania, have invented certain new and useful Improvements in Hangers for Trolley-Wires; and I do hereby declare the following to be a full, clear, and exact description of the invention, such as will enable others skilled in the art to which it appertains to make and use the same.

My invention relates to an improvement in hangers for trolley wires,—the object of the invention being to so construct the device that it shall be made to tightly clamp the trolley wire without the use of solder, and so that it shall withstand any strain which may be brought on the trolley wire.

A further object is to construct the device in such manner that it can be readily and quickly removed or loosened from the trolley wire when it is desired to repair or stretch the latter, and which may be equally as quickly tightened on or gripped to the wire when the latter shall have been stretched or repaired.

With these objects in view the invention consists in certain novel features of construction and combination and arrangements of parts as hereinafter set forth and pointed out in the claims.

In the accompanying drawings: Figure 1 is a view showing an application of my invention. Fig. 2 is a detail view of the hanger. Fig. 3 is a sectional view of the same. Figs. 4 and 5 show the two parts of the hanger separated or detached.

My improved hanger comprises, in general, two plates A, B,—one of said plates having perforations $a$ for the reception of screws $b$ which pass through screwthreaded perforations $a'$ in the other plate, whereby to secure said plates together, with the trolley wire C clamped between them in a manner presently explained. Each plate A, B, is made with a preferably curved groove or recess $d$, which grooves or recesses, when the plates are secured together, are adapted to align one with the other, having the trolley wire located between and within them.

In the grooves $d$ of the plates A, B, sharpened projections or teeth $e$ are made to project and these teeth or projections are adapted to bite the trolley wire and prevent the latter from slipping. When the plates A and B are tightly clamped together, with the trolley wire between them, the trolley wire will not only be prevented from slipping by being engaged by the teeth or projections $e$, but said teeth or projections extending transversely of the grooves or recesses $d$, the trolley wire will be forced into said grooves between the teeth or projections, thus adding materially in preventing the slipping of the trolley wire.

The plate A of the hanger may be provided at a point between its ends, preferably at its center, with a socketed boss $f$, for the reception of a supporting bell $g$ connected to a suspending wire $h$, which latter is secured at its ends to posts or poles $i$ at the sides of the track over which the trolley wire C is disposed.

At the ends of one of the plates A, B, of the hanger, preferably at the ends of the plate A, perforated ears $j$ are made, for the reception of "hold-back" wires $k$, which are preferably passed through the perforations of said lugs and, after being preferably twisted once or twice, are secured at their extremities to posts or poles $l$, at the sides of the track. From this construction and arrangement of parts it will be seen that the hold back wires $h$ will render the hanger capable of withstanding any strain which may be brought to bear upon it. It will also be seen that, owing to the construction of the hanger as above explained, the slipping of the trolley wire in the hanger will be rendered practically impossible. And again, with my improved hanger, the trolley wire can be easily and quickly released when it is desired to take up slack in the wire, to mend a broken wire, or for other purpose, there being no solder used as is customary with such hangers,—it being simply necessary with my device to loosen the screw which holds the plates A, B, together.

My improvements are very simple in construction, cheap to manufacture, easy to operate and are effectual, in every respect, in the performance of their functions.

Having fully described my invention, what I claim as new, and desire to secure by Letters Patent, is—

1. In a hanger for trolley wires, the combination with two plates, of teeth or projections on the inner faces thereof, substantially as set forth.

2. In a hanger for trolley wires, the combination with two plates having grooves therein, of teeth or projections in said grooves, substantially as set forth.

3. In a hanger for trolley wires, the combination with two plates adapted to be secured together, and having grooves in their inner faces, of teeth or projections extending transversely of said grooves, substantially as set forth.

4. In a hanger for trolley wires, the combination with two plates and means for removably securing said plates together, of teeth or projections on the inner faces of said plates, substantially as set forth.

5. In a hanger for trolley wires, the combination with two plates having perforations therein and having grooves in their inner faces, of screws adapted to pass through said perforations to secure the plates together with a trolley wire between them, and projections or teeth in the grooves in said plates adapted to bite said trolley wire, substantially as set forth.

6. A hanger for trolley wires comprising two separable members adapted to be secured together and hold a trolley wire between them, one of said members having perforations to receive hold-back or suspending wires, substantially as set forth.

In testimony whereof I have signed this specification in the presence of two subscribing witnesses.

GEORGE FORBUS.

Witnesses:
H. DE K. RIDER,
ADALINE CARPENTER.